United States Patent
Higashinaka

(10) Patent No.: US 10,122,556 B2
(45) Date of Patent: Nov. 6, 2018

(54) TRANSMITTER AND RECEIVER

(71) Applicant: Mitsubishi Electric Corporation, Chiyoda-ku (JP)

(72) Inventor: Masatsugu Higashinaka, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/520,013

(22) PCT Filed: Sep. 7, 2015

(86) PCT No.: PCT/JP2015/075298
§ 371 (c)(1),
(2) Date: Apr. 18, 2017

(87) PCT Pub. No.: WO2016/076002
PCT Pub. Date: May 19, 2016

(65) Prior Publication Data
US 2017/0331653 A1  Nov. 16, 2017

(30) Foreign Application Priority Data

Nov. 13, 2014  (JP) ................. 2014-230364

(51) Int. Cl.
*H04L 27/12* (2006.01)
*H04L 27/14* (2006.01)
(Continued)

(52) U.S. Cl.
CPC .............. *H04L 27/12* (2013.01); *H04L 27/10* (2013.01); *H04L 27/14* (2013.01); *H04L 27/18* (2013.01); *H04L 27/32* (2013.01)

(58) Field of Classification Search
CPC ................................ H04L 27/12; H04L 27/14
See application file for complete search history.

(56) References Cited

U.S. PATENT DOCUMENTS

| 6,215,813 B1 | 4/2001 | Jones et al. |
| 6,232,906 B1 | 5/2001 | Tada |
| 2014/0307832 A1 | 10/2014 | Sagong et al. |

FOREIGN PATENT DOCUMENTS

| JP | 6-112981 A | 4/1994 |
| JP | 2000-78214 A | 3/2000 |

(Continued)

OTHER PUBLICATIONS

Ari Viinikainen, et al., "A New Modulation Scheme for GSM EDGE," TENCON 2005, 2005 IEEE Region 10, Nov. 2005, (5 pages) (with English abstract).

(Continued)

*Primary Examiner* — Ross Varndell
(74) *Attorney, Agent, or Firm* — Oblon, McClelland, Maier & Neustadt, L.L.P.

(57) ABSTRACT

A transmitter for use in a communication system uses a orthogonal modulation method, and the transmitter includes: an orthogonal sequence prescriber that prescribes association between orthogonal signals and information words determined on the basis of sizes of differences between information words of a plurality of mutually different information words and a probability of occurrence of decision errors between orthogonal signals of a plurality of mutually orthogonal signals; and a symbol mapper that, upon input of any of the information words, generates modulation symbols based on the orthogonal signals associated with the input information word according to the associations prescribed by the orthogonal sequence prescriber.

12 Claims, 11 Drawing Sheets

(51) Int. Cl.
  *H04L 27/10* (2006.01)
  *H04L 27/18* (2006.01)
  *H04L 27/32* (2006.01)

(56) References Cited

FOREIGN PATENT DOCUMENTS

| JP | 2001-7875 A | 1/2001 |
| JP | 2003-188930 A | 7/2003 |
| KR | 2001-0046947 A | 6/2001 |
| WO | 2014/171710 A1 | 10/2014 |

OTHER PUBLICATIONS

Kazuhisa Haeiwa, "Digital Tsushin-Hoso no Henfukucho Gijutsu," 1st Edition, Corona Publishing Co., Ltd. Apr. 10, 2008, (12 pages).
Myong C. Kim, et al., "Performance of Sequential Decoding with Biorthogonal Modulation and Q-Level Quantization," IEEE Transactions on Communication Technology, Concise Papers, Feb. 1971, (pp. 88-92).
International Search Report dated Oct. 13, 2015 in PCT/JP2015/075298 filed Sep. 7, 2015.
Office Action dated Aug. 1, 2017 in Japanese Patent Application No. 2016-558913 (with English language translation).
Extended European Search Report dated Jun. 5, 2018 in Patent Application No. 15859143.8, 8 pages.

FREQUENCY 1

FREQUENCY 2

FREQUENCY 3

FREQUENCY 4

TRANSMITTER AND RECEIVER

TECHNICAL FIELD

The present disclosure relates to a transmitter and a receiver that use an orthogonal modulation method.

BACKGROUND ART

Orthogonal modulation method, which transmits transmission information by allocating the transmission information to orthogonal signals, is a method, that is capable of suppressing bit error rates occurring in a white Gaussian noise transmission channel when the number of the dimensions of the utilized orthogonal signals is large, and that is particularly useful in a communication system that requires high power efficiency. The orthogonal signals used in orthogonal modulation method can be configured as desired as long as the orthogonal signals are mutually orthogonal. For example, orthogonal frequency shift keying (FSK), which selects and transmits a single sequence associated with the transmission information from among sequences formed by combining sine waves of different frequencies, can be regarded as one type of orthogonal modulation method.

Although an orthogonal matrix is used in orthogonal modulation method to define the orthogonal signals, a method of extension of orthogonal modulation method is proposed as bi-orthogonal modulation method that uses an orthogonal matrix and, for example, a matrix that is complementary to the orthogonal matrix, to define the orthogonal signals (Non-Patent Literature 1). Here, the complementary matrix is a matrix, for example, in the case in which each of the elements of the orthogonal matrix is a binary value of "0" or "1", in which the "0" and "1" values of each of the elements are reversed. In bi-orthogonal modulation method, the number of orthogonal signals capable of allocation for the transmission information doubles, and the information amount capable of transmission by a single orthogonal signal doubles, and thus frequency utilization efficiency can be improved.

For the portion defined using the matrix, among the orthogonal signals of the aforementioned bi-orthogonal modulation method, that is complementary to the orthogonal matrix, the signal may be regarded as a signal having an inverse phase with respect to the signal of the orthogonal signal defined by the orthogonal matrix acting as the source of frequency utilization efficiency thereof, that is to say, may be regarded as a signal having phase-rotated by $\pi$. Further, due to there being no requirement for restricting the phase rotation to $\pi$, bi-orthogonal modulation method can be generalized as the method of transmitting transmission information by use of orthogonal signals defined by a single source orthogonal matrix, and by a new orthogonal matrix that phase-rotates by a predetermined phase rotation amount the source orthogonal matrix.

Furthermore, many more orthogonal signals can be further defined by producing a plurality of orthogonal matrixes that are phase-rotating by different phase rotation amounts relative to the single orthogonal matrix, and in this case, the number of sequences capable of allocation for the transmission information increases in response to the number (types) of phase rotation amounts of the phase rotations of the orthogonal matrix. In this manner, the number of orthogonal signals in bi-orthogonal modulation method is determined according to the number of dimensions of the source orthogonal matrix and the number (types) of phase rotation amounts of the phase rotations of the source orthogonal signal, and the information amount, such as the bit count, that can be transmitted using a single symbol (one orthogonal signal) is determined according to the number of orthogonal signals. When the number of the orthogonal signals increases, the transmittable information amount using a single symbol can increase, and frequency utilization efficiency can increase.

CITATION LIST

Non-Patent Literature

Non-Patent Literature 1: Myong C. KIM et al., "Performance of sequential decoding with biorthogonal modulation and Q-level Quantization," IEEE Transaction on Communication Technology, pp. 88-92, February 1971.

SUMMARY OF INVENTION

Technical Problem

Conventional bi-orthogonal modulation method increases the transmittable information amount per single symbol by increasing the number of orthogonal signals that allocate for transmission information in the aforementioned manner, improves frequency utilization efficiency, and improves communication performance. However, in cases such as that of a radio transmission channel in which the signal (received signal) received by a receiver has noise, upon discrimination of the received signal and then acquiring of the signal (transmitted signal) transmitted from the transmitter, decision errors occur, and thus errors occur in the transmitted information. Thus to improve communication performance of actual communication, there is a need to decrease the information errors that result from decision errors.

The present disclosure is developed to solve the aforementioned problem, and the objective of the present disclosure is to obtain, in a communication system using orthogonal modulation method, a transmitter and receiver that are capable of decreasing the information errors caused by decision errors, and that are capable of improving communication performance.

Solution to Problem

A transmitter of the present disclosure includes:
an orthogonal sequence prescriber to prescribe association between information words and orthogonal signals based on sizes of differences between information words of a plurality of mutually different information words and a probability of occurrence of decision errors between orthogonal signals of a plurality of mutually orthogonal signals; and
a symbol mapper to, upon inputting of any of the information words, generate modulation symbols based on the orthogonal signals associated with the input information words according to the associations prescribed by the orthogonal sequence prescriber.

The receiver of the present disclosure includes:
a correlation processor to find a correlation between a plurality of orthogonal signals that are mutually orthogonal and an input signal obtained from a signal received from an opposing transmitter; and
a determiner to determine, based on the correlation found by the correlation processor, which of the orthogonal signals has been transmitted by the opposing transmitter, and restore an information word corresponding to a determined orthogonal signal based on an association between the information words and the orthogonal signals determined based on a size of differences between a plurality of mutually different orthogonal signals and the probability of occurrence of determination errors between the orthogonal signals.

Advantageous Effects of Invention

According to the present disclosure, the transmitter of the present disclosure includes a symbol mapper that generates modulation symbols based on the orthogonal signals associated with the information word to be transmitted, based on association between the orthogonal signal and the information word, the association being determined on the basis of probability of occurrence of decision errors between the orthogonal signals and the information words. Thus generation and transmission are possible of a transmission signal having been symbol mapped to reduce errors of transmitted information that occur due to decision errors at the receiver, and communication performance can be improved.

The receiver of the present disclosure includes a determiner to:

find a correlation between the orthogonal signal used in communication with the opposing transmitter and an input signal obtained from the signal received from the opposing transmitter;

determine, based on the found correlation, the orthogonal signal transmitted by the opposing transmitter; and restore the information word associated with the orthogonal signal determined on the basis of the association between the information words and the orthogonal signals determined to associate the combination of orthogonal signals in which decision errors occur with difficulty with the combination of information words having the large Hamming distance, on the basis of probability of occurrence of decision errors between orthogonal signals and the size of differences between the information words.

Thus errors of transmitted information occurring due to decision errors at the receiver can be reduced, and communication performance can be improved.

DESCRIPTION OF EMBODIMENTS

Embodiments of the present disclosure are described below in reference to figures. Further, in the figures referenced below in the description, components that are identical or equivalent are assigned the same reference symbol.

Embodiment 1

Figure 1:
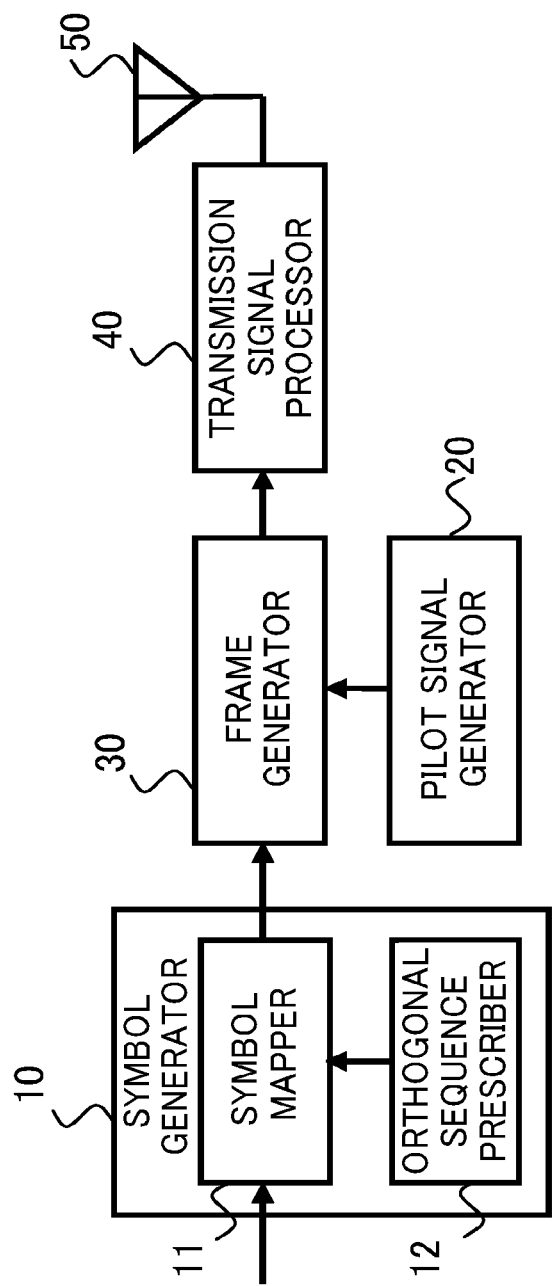
FIG. 1 is a block diagram illustrating one example of a function configuration of a transmitter of Embodiment 1 of the present disclosure.

FIG. 1 is a block diagram illustrating one example of a function configuration of a transmitter of Embodiment 1 of the present disclosure. In FIG. 1, the transmitter of this embodiment includes a symbol generator 10, a pilot signal generator 20, a frame generator 30, a transmission signal processor 40, and a transmission antenna 50. Further, the symbol generator 10 includes a symbol mapper 11 and an orthogonal sequence prescriber 12.

The orthogonal sequence prescriber 12 of the symbol generator 10 prescribes association between an information word, such as a bit sequence, and an orthogonal signal. A to-be-transmitted information word input to the symbol generator 10 is then input to the symbol mapper 11. The symbol mapper 11 selects (performs symbol mapping), on the basis of the association between the information words and the orthogonal signals prescribed by the orthogonal sequence prescriber 12, an orthogonal signal associated one-to-one with the input information word, and the symbol mapper 11 generates and outputs, on the basis of the selected orthogonal signal, the bi-orthogonal modulation symbol. Here, various types of configurations may be considered for the orthogonal sequence prescriber 12, such as a configuration that uses a table format for retaining the association between the information word and the orthogonal signal, a configuration that generates the orthogonal signal by performing theoretical calculations with respect to the information word, and the like.

The pilot signal generator 20 generates a pilot signal that is known to both the transmitter and the receiver, so that the receiver opposing the transmitter performs processing such as synchronization processing required to demodulate the received signal. Thereafter, the frame generator 30 receives the bi-orthogonal modulation symbols output from the symbol generator 10 and the pilot signal output from the pilot signal generator 20 and generates frames (transmission frames) arranged in accordance with a frame format previously determined for these signals.

The transmission frames generated by the frame generator 30 are input to the transmission signal processor 40. The transmission signal processor 40 performs a certain transmission signal processing as required in order to transmit a signal with respect to the input transmission frame, and generates and outputs a transmission signal to the transmission antenna 50. Here, the "certain transmission signal processing" is processing such as digital-analog (D/A) conversion, high frequency signal processing, and the like, and processing may be performed as required using a known method suitable for the communication system utilizing the present disclosure. Further, the transmission signal input to the transmission antenna 50 is transmitted by radio waves.

The aforementioned symbol generator 10, the symbol mapper 11 and the orthogonal sequence prescriber 12 included in the symbol generator 10, the pilot signal generator 20, the frame generator 30, and the transmission signal processor 40 can be implemented using hardware such as an ASIC and the like, or alternatively, can be implemented using a processor, including peripheral circuits such as memory and the like, and a program executed by the processor. Further, the processor, the program, and the hardware such as the ASIC may be combined, and part of these functions may be implemented using the ASIC and the like, and another part of these functions may be implemented by the processor and the program.

Operation of the transmitter of this embodiment is described next. Further, for simplification of the description hereinafter, the to-be-transmitted information word is described as the bit sequence (transmission bit sequence). Further, the modulation method is described as the bi-orthogonal modulation method based on orthogonal FSK that selects, from among a total of four orthogonal signals formed by combining sine waves of two different frequencies and two phase states, an orthogonal signal in response to the transmission bit sequence, and that transmits the selected orthogonal signal. In this case, since there are four states that can be expressed by one orthogonal signal, two-bit transmission can be performed using one bi-orthogonal modulation symbol. That is to say, the bit sequence associated with the orthogonal signal is two bits.

Figure 2:
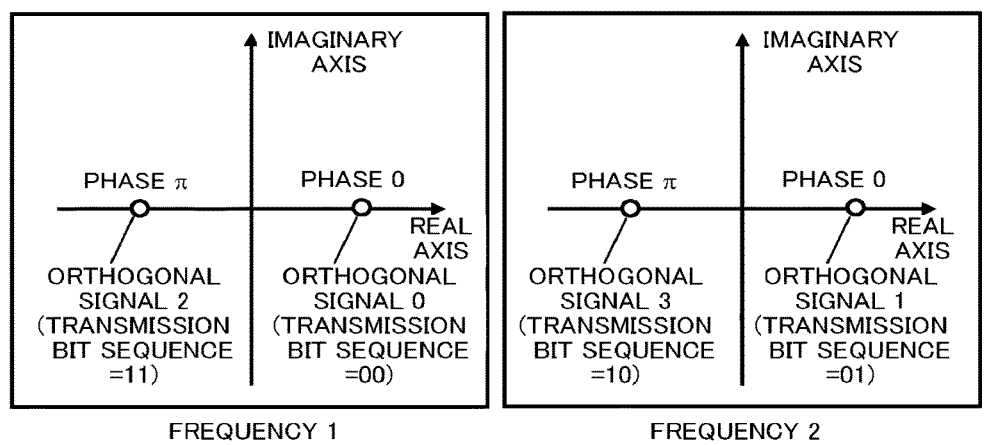
FIG. 2 is a schematic drawing illustrating one example of a symbol map of Embodiment 1 of the present disclosure.

FIG. 2 is a schematic drawing illustrating one example, determined by the orthogonal sequence prescriber 12 of the symbol generator 10, of association (such association is referred to below as "symbol mapping") between the transmission bit sequence and the orthogonal signal. Here, a case is illustrated in which a frequency 1 and a frequency 2 are defined as the frequencies of the sine waves that are constituent elements of the orthogonal signal, and in which phase 0 and phase $\pi$ are defined as the phase states that are the additional constituent element.

As illustrated in FIG. 2, four orthogonal signals, from orthogonal signal 0 to orthogonal signal 3, are defined by the symbol mapping of this example. The orthogonal signal 0 is defined to have the frequency 1 and phase 0, the orthogonal signal 1 is defined to have the frequency 2 and phase 0, the orthogonal signal 2 is defined to have the frequency 1 and phase $\pi$, and the orthogonal signal 3 is defined to have the frequency 2 and phase $\pi$. Further, the transmission bit sequence "00" is associated with the orthogonal signal 0, the transmission bit sequence "01" is associated with the orthogonal signal 1, the transmission bit sequence "11" is associated with the orthogonal signal 2, and the transmission bit sequence "10" is associated with the orthogonal signal 3.

Upon input of "00" as the transmission bit sequence, the symbol mapper 11 of the symbol generator 10, on the basis of the symbol map of FIG. 2, references the orthogonal sequence prescriber 12, selects the frequency 1 as the frequency of the sine wave, selects 0 as the phase state of the initial phase, and outputs the selected sine wave waveform as the bi-orthogonal modulation symbol during a single symbol section. In the same manner, upon input of "01" as the transmission bit sequence, the symbol mapper 11 uses the frequency 2 and the initial phase 0. Upon input of "10" as the transmission bit sequence, the symbol mapper 11 uses the frequency 2 and the initial phase $\pi$. Upon input of "11", the symbol mapper 11 uses the frequency 1 and the initial phase $\pi$. Here, the transmitter of the present embodiment is characterized in that, when Hamming distance is large for the combination of transmission bit sequences, the association between the transmission bit sequence and the orthogonal signal is determined so that inter-signal point distance between the respective orthogonal signals corresponding to the transmission bit sequences is large.

In the present embodiment, the transmission bit sequence corresponding to one orthogonal signal is 2 bits, and thus the maximum value of Hamming distance between transmission bit sequences is 2. The combinations resulting in the maximum Hamming distance are "00" and "11", and "01" and "10". On the other hand, when both sine waves are taken to have an amplitude of A, the maximum value of the inter-signal point distance for the initial phase 0 orthogonal signal and the initial phase $\pi$ orthogonal signal when the frequency is the same is 2 A. In the case of orthogonal signals of different frequencies, the inter-signal point distance is A times the square root of 2 due to properties of the mutually orthogonal signals. In the present embodiment, an orthogonal signal is associated, from the standpoint of inter-signal point distance, for the transmission bit sequences "00" and "11" and the transmission bit sequences "01" and "10" to be far apart, and the symbol generator 10 allocates an orthogonal signal to the input transmission bit sequence on the basis of such association.

Thereafter, the pilot signal generator 20 generates a pilot signal as a signal that is previously known to both the transmitter and the transmitter-opposing receiver. Further, no restriction is placed on the pilot signal, and any desired signal may be used as the pilot signal. The generated pilot signal is transferred to the frame generator 30. Further, the pilot signal may be used by storing beforehand in memory and the like included in the frame generator 30 and then reading out the stored signal, or alternatively, the pilot signal may be generated by a logic calculator and the like, and then used.

Thereafter, the frame generator 30 receives the bi-orthogonal modulation symbols output from the symbol generator 10 and the pilot signal output from the pilot signal generator 20, and performs processing to arrange these signals in accordance with a previously determined frame format. Further, the present disclosure is not limited to a specific frame format, and a suitable frame format may be used that is appropriate for a given system.

The frame (transmission frame) generated by the frame generator 30 is input to the transmission signal processor 40. The transmission signal processor 40 performs certain transmission signal processing of the input transmission frame, and sends the processed input transmission frame to the transmission antenna 50. Then the transmission antenna 50 transmits the input transmission signal by radio waves.

Figure 3:
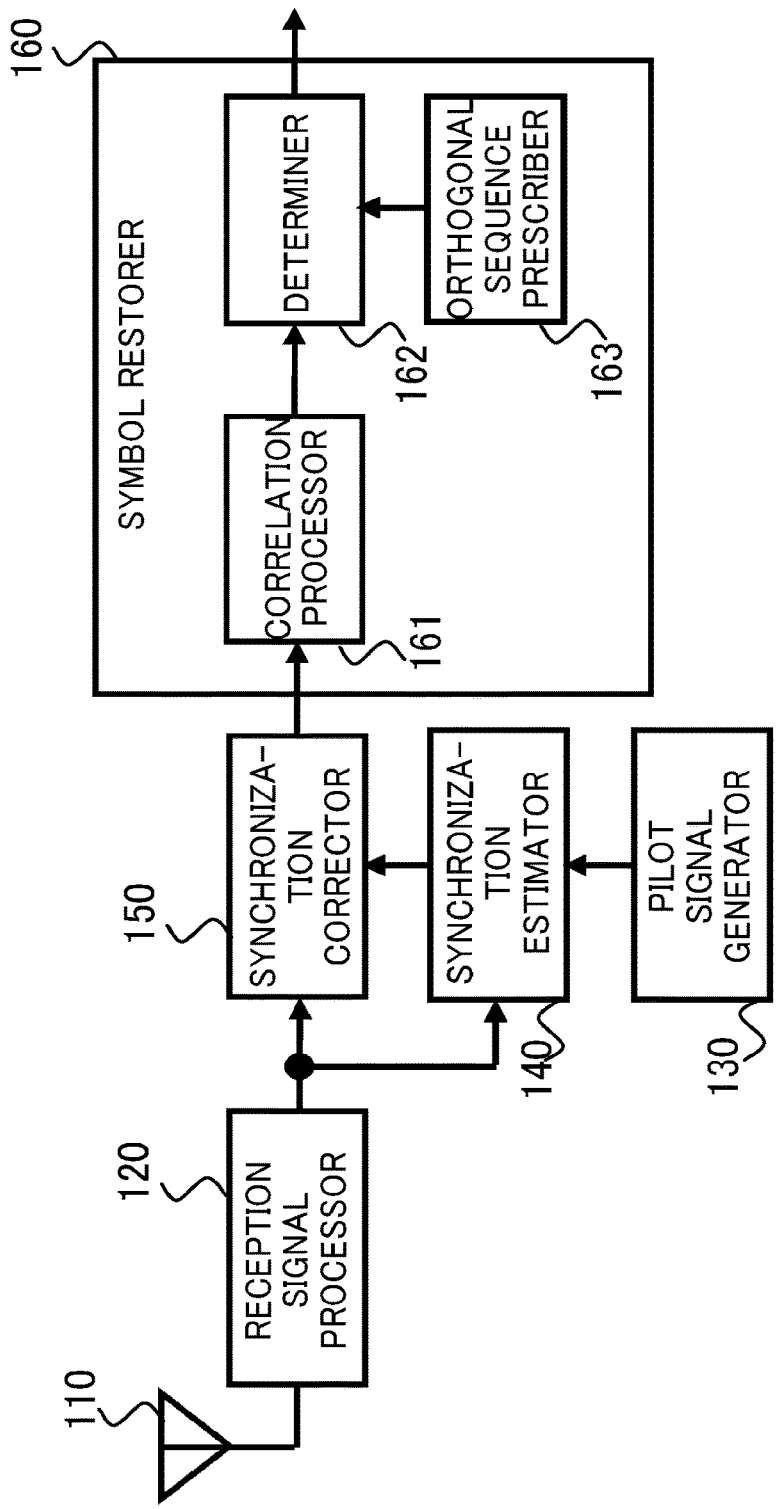
FIG. 3 is a block diagram illustrating one example of a function configuration of a receiver of Embodiment 1 of the present disclosure.

The receiver that receives the wireless signal transmitted from the transmitter of the present embodiment is described below. FIG. 3 is a block diagram illustrating a function configuration of the receiver of Embodiment 1 of the present disclosure. The receiver of the present embodiment includes a reception antenna 110, a reception signal processor 120, a pilot signal generator 130, a synchronization estimator 140, a synchronization corrector 150, and a symbol restorer 160. Further, the symbol restorer 160 includes a correlation processor 161, a determiner 162, and an orthogonal sequence prescriber 163.

The reception antenna 110 receives the wireless signal transmitted from the opposing transmitter. Here, the wireless signal received by the reception antenna 110 is the wireless signal transmitted from the aforementioned transmitter, and this signal has undergone symbol mapping on the basis of association between the transmission bit sequence and the orthogonal signal that is determined such that the combination of transmission bit sequences that have a large Hamming distance indicating the size of differences between the information words corresponds to the combination of orthogonal signals that has a large inter-signal point distance.

The analog wireless signal received by the reception antenna 110 is input to the reception signal processor 120. The reception signal processor 120 performs a certain reception signal processing required for digital processing of the analog wireless signal, and the baseband digital received signal, which is the signal of the results of processing, is output to the synchronization estimator 140 and the synchronization corrector 150. Here, the "certain reception signal processing" performed by the reception signal processor 120 is processing such as high frequency signal processing and analog-digital (A/D) conversion processing. Such processing may be performed by any known method suitable for the communication system utilizing the present disclosure.

The pilot signal generator 130 generates the pilot signal required for the below-described synchronization estimation processing, and output the generated pilot signal to the synchronization estimator 140. Here, the generated pilot signal has the same content as the signal generated by the pilot wave signal generator 20 of the transmitter, and the pilot signal generator 130 may be configured in the same manner as the pilot signal generator 20.

The synchronization estimator 140 uses the input baseband digital received signal and the input pilot signal to perform the synchronization estimation processing required for performing demodulation processing, and outputs the results of synchronization estimation to the synchronization corrector 150. Here, "synchronization estimation processing" is processing to estimate synchronization timing of the input baseband digital received signal such as frequency synchronization, symbol timing synchronization, and carrier phase synchronization. The "results of synchronization estimation" are values such as frequency, clock timing, and carrier phase of the input baseband digital received signal. The synchronization corrector 150 performs synchronization correction of the baseband digital received signal on the basis of the input the result of synchronization estimation, and outputs to the symbol restorer 160 the synchronization-corrected baseband digital received signal. Further, the synchronization estimation processing performed by the synchronization estimator 140 and the synchronization correction processing performed by the synchronization corrector 150 may be performed by any known method suitable for the communication system utilizing the present disclosure.

The symbol restorer 160 restores the bit sequence from the input synchronization-corrected baseband digital signal and outputs the restored bit sequence as the demodulation signal. The synchronization-corrected baseband digital signal input to the symbol restorer 160 is input to the correlation processor 161. The correlation processor 161 performs correlation processing and finds a correlation between the signal input (input signal) and the orthogonal signal used in the symbol mapping at the transmitter. Further, the correlation processing may be performed by any desired method suitable for the communication system, and the correlation processor 161 and the orthogonal sequence prescriber 163 may be realized appropriately for the executed correlation processing. For example, bi-orthogonal modulation method based on orthogonal FSK is used in the present embodiment, and thus the correlation processing of the present embodiment can be performed by Fourier transformation of the input signal.

The determiner 162 uses the correlation found by the correlation processor 161 to determine the orthogonal signal transmitted by the opposing transmitter, and to output the bit sequence associated with the orthogonal signal as a demodulation signal. Further, the orthogonal sequence prescriber 163 is the block storing the symbol map illustrated in FIG. 2, and the determiner 162 references the symbol map stored in the orthogonal sequence prescriber 163 and outputs the bit sequence associated with the orthogonal signal.

The reception signal processor 120, the pilot signal generator 130, the synchronization estimator 140, the synchronization corrector 150, the symbol restorer 160, and the correlation processor 161, the determiner 162, and the orthogonal sequence prescriber 163 included in the symbol restorer 160 described above can be implemented using hardware such as an ASIC and the like, or alternatively, can be implemented using a processor, including peripheral circuits such as memory and the like, and a program executed by the processor. Further, the processor, the program, and the hardware such as the ASIC may be combined, and part of these functions may be implemented using the ASIC and the like, and another part of these functions may be implemented by the processor and the program.

Operation of the receiver of the present embodiment is described next. Upon reception of the wireless signal transmitted from the opposing transmitter, the reception antenna 110 outputs to the reception signal processor 120 the analog received signal. The reception signal processor 120 executes certain received signal processing with respect to the input analog received signal and outputs the baseband digital received signal. The baseband digital received signal is input to the synchronization estimator 140 and the synchronization corrector 150.

The pilot signal generator 130 generates the pilot signal and outputs the generated pilot signal to the synchronization estimator 140. The synchronization estimator 140 uses the pilot signal and the input baseband digital received signal to perform synchronization estimation processing, and outputs the results of the synchronization estimation processing to the synchronization corrector 150. The synchronization corrector 150, on the basis of the results of synchronization estimation from the synchronization estimator 140, performs synchronization correction processing of the input baseband digital received signal, and outputs to the correlation processor 161 of the symbol restorer 160 the synchronization-corrected baseband digital received signal.

The correlation processor 161 uses Fourier transformation of the input signal to find a correlation with the orthogonal signals. In the results of the Fourier transformation of the bi-orthogonal modulation symbols (transmission symbols) of the signal transmitted by the transmitter, the signal component emerges at the frequency 1 when the transmission symbol is a sine wave of the frequency 1, and the signal component of the frequency 2 is zero. Further, the signal component of the frequency 1 at this time is A in the case in which the initial phase of the transmission symbol is zero, and is −A in the case in which the initial phase is π. Similarly, the signal component emerges at the frequency 2 when the transmission symbol is a sine wave of the frequency 2, and the transmission signal component of the frequency 1 is zero. Further, the frequency 2 signal component at this time is A in the case in which the initial phase of the transmission symbol is zero, and is −A in the case in which the initial phase is π.

When the results of Fourier transformation of the input signal by the correlation processor 161 are close to the results of Fourier transformation of the aforementioned transmission symbol, a correlation may be said to be high, and when the result of Fourier transformation of both are not close mutually, the correlation may be said to be low. Thus the correlation processor 161 can find a correlation with the orthogonal signal by Fourier transformation of the input signal.

The correlation processor 161 outputs the found correlation to the determiner 162. The determiner 162, on the basis of the heights of the correlation input to the determiner 162, determines the orthogonal signal which seems most certain to be considered to be transmitted by the opposing transmitter. Thereafter, The determiner 162 references the association between the bit sequence and the orthogonal signals stored in the orthogonal sequence prescriber 163, restores the bit sequence corresponding to the determined orthogonal signal, and outputs the restored bit sequence as the demodulation signal. That is to say, according to the symbol mapping of FIG. 2, in the case in which the orthogonal signal 0 seems most certain to be the orthogonal signal, then "00" is output as the bit sequence. Similarly, in the case in which the orthogonal signal 1 seems most certain to be the orthogonal signal, then "01" is output as the bit sequence. In the case in which the orthogonal signal 2 seems most certain to be the orthogonal signal, then "11" is output as the bit sequence. In the case in which the orthogonal signal 3 seems most certain to be the orthogonal signal, then "10" is output as the bit sequence.

In cases in which the baseband digital received signal has noise and distortion, the decision errors are generally easy to generate between orthogonal signals that have a small inter-signal point distance, and the decision errors are difficult to generate between orthogonal signals that have a large inter-signal point distance. On the other hand, when considering a single decision error, in the determination errors between bit sequences that have a large Hamming distance (for example, the decision error between "00" and "11"), the number of bit errors is more than in the determination errors between bit sequences having a small Hamming distance (for example, the determination error between "00" and "01").

In the symbol mapping of the present embodiment, on the basis of probability of occurrence of decision errors, orthogonal signals are associated with bit sequences so that the combination of the orthogonal signal in which inter-signal point distance is large and in which decision error is unlikely to occur is associated with the combination of transmission bit sequences that has a large Hamming distance. Thus the possibility of the occurrence of error between transmission bit sequences having a large Hamming distance decreases due to the aforementioned decision errors property, and thus bit errors occurring due to decision errors (errors on the transmitted information) can be reduced.

The transmitter of the present embodiment in the aforementioned manner includes:

an orthogonal sequence prescriber that prescribes associations between the information words and the orthogonal signals by:

based on the size of differences between information words and probability of occurrence of decision errors between orthogonal signals, associating the combination of the information words having a large Hamming distance indicating the size of differences between information words with the orthogonal signals for which probability of occurrence of decision errors is low, and with respect to the association between the combination of the information words and the combination of the orthogonal signals, associating one information word with one orthogonal signal, and associating other information words with other orthogonal signals; and a symbol mapper that generates the modulation symbols based on the orthogonal signals associated with the to-be-transmitted information words on the basis of the association between the information words and the orthogonal signals determined by the orthogonal sequence prescriber.

Thus a transmission signal can be generated and transmitted for which symbol mapping is performed that decreases errors of transmitted information occurring due to decision errors at the receiver, and communication performance can be improved.

Further, the receiver of the present embodiment includes:

a correlation processor finding a correlation between the input signal obtained from the signal received from the opposing transmitter and the orthogonal signals associated with the information words used in the communication with the opposing transmitter; and a determiner that:

determines, based on the correlation found by the correlation processor, which of the orthogonal signals has been transmitted by the opposing transmitter, and causes association between the combination of information words having a large Hamming distance and the combination of orthogonal signals for which a probability of occurrence of decision errors is low on the basis of the size of differences between the information words and the probability of occurrence of decision errors between the orthogonal signals; and restores an information word corresponding to the determined orthogonal signal based on an association between the orthogonal signals and the information words, the association determined by associating one information word with one orthogonal signal, and associating other information words with other orthogonal signals with respect to the association between the combination of the information words and the combination of the orthogonal signals.

Thus errors of transmitted information occurring due to decision errors at the receiver can be reduced, and communication performance can be improved.

Further, although a method is described using orthogonal signals composed based on orthogonal FSK as an example of bi-orthogonal modulation method in the present embodiment, the present disclosure is not limited to such orthogonal signals, and also is applicable to bi-orthogonal modulation method composed based on any desired orthogonal matrix. For example, by similar association between the information words and the orthogonal signals in the case of use of an orthogonal matrix such as a Hadamard matrix, errors of transmitted information occurring due to decision errors at the receiver can be reduced, and communication performance can be improved.

Composition of the orthogonal signals on the basis of orthogonal FSK, in comparison to the case of composition of the orthogonal signals on the basis of the Hadamard matrix and the like, has the effect of decreasing peak to average power ratio (PAPR) This decrease is due to, in the case of bi-orthogonal modulation method based on orthogonal FSK, tracing a unit circle trajectory of the waveform of the signal transmitted within a single symbol time period (time period in which a single symbol is transmitted) and fixing of the envelope of the signal in the complex plane. In contrast, in the case of bi-orthogonal modulation method based on the Hadamard matrix and the like, the signal within a single symbol time period comes and goes through +1 and −1, and thus the signal envelope changes greatly.

Figure 4:
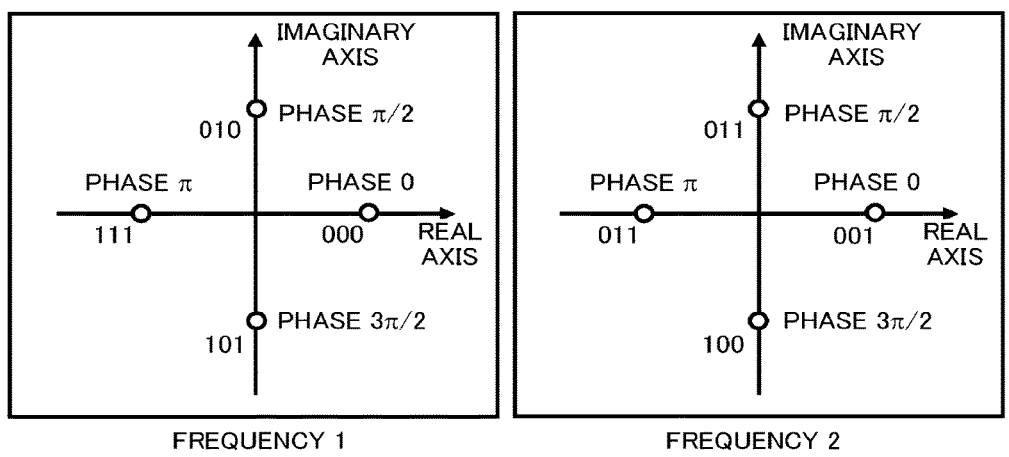
FIG. 4 is a schematic drawing illustrating the symbol map of a modified example of Embodiment 1 of the present disclosure.

Further, configuration of the orthogonal signals used in bi-orthogonal modulation method in the present embodiment is possible that adopts zero or π (two initial phase states) as the initial phase with respect to the source orthogonal matrix. However, the present disclosure is not limited to such a configuration, and a configuration can be adopted that is composed using a greater number of phase states. FIG. 4 is an example of symbol mapping, in the case of composition of orthogonal signals using bi-orthogonal modulation method based on orthogonal FSK, and in the case of adoption of zero, π/2, π, 3π/2 as four initial phase states. In the example of this figure, in response to the transmission bit sequence, a total of eight states are adopted (two different frequencies and four different phase states), and transmission is possible of a bit sequence of three bits per one symbol. In the case of this example, the maximum Hamming distances is three. Thus the combination of bit sequences resulting in the Hamming distance of three is associated with the orthogonal signal for which the inter-signal point distance becomes maximum.

Figure 5:
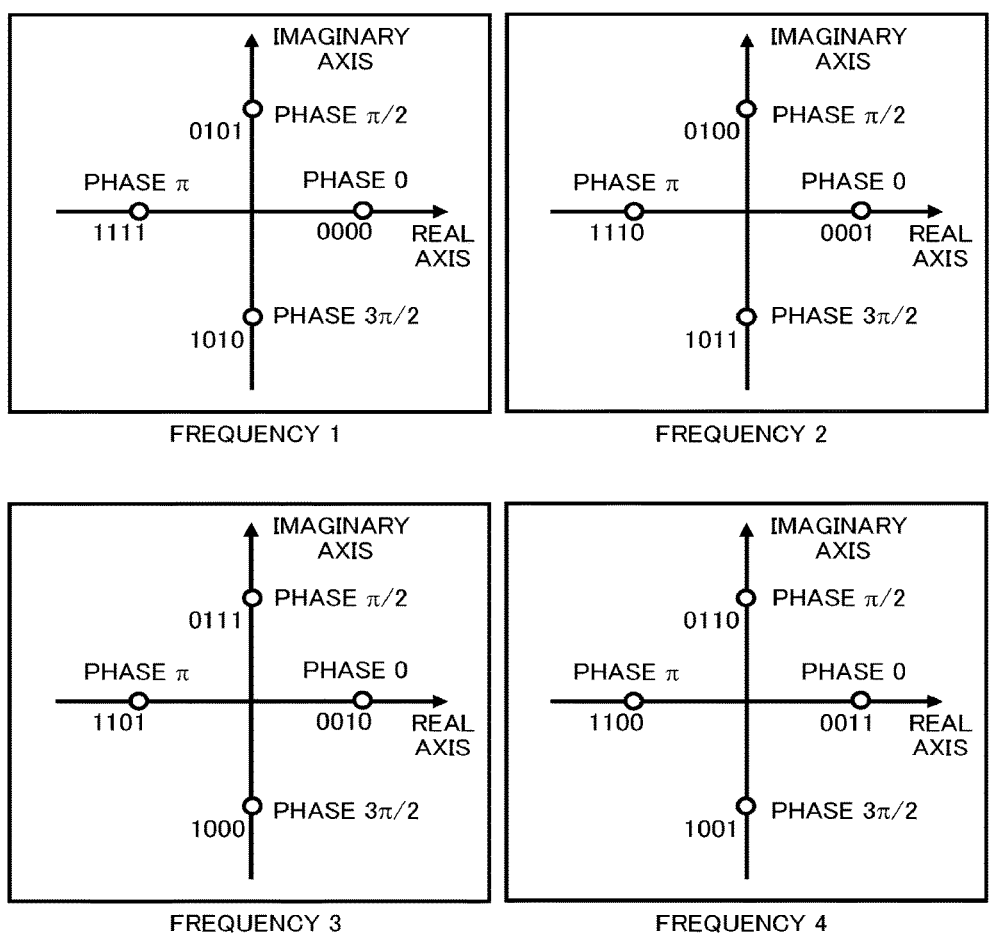
FIG. 5 is a schematic drawing illustrating the symbol map of a modified example of Embodiment 1 of the present disclosure.

Further, although orthogonal signals are composed using bi-orthogonal modulation method based on orthogonal FSK in the present embodiment, adoption is possible as in the case of composition of the orthogonal signals using any desired number of dimensions, such as orthogonal 4FSK and the like. FIG. 5 is an example of symbol mapping in the case of use of an orthogonal matrix composed so as to adopt four states (zero, π/2, π, and 3π/2) as initial phase states with respect to sine waves of four different frequencies in orthogonal 4FSK. By configuration of orthogonal signals based on orthogonal 4FSK in the present example, the number of frequencies increases two-fold in comparison to the case illustrated in FIG. 4, and thus transmission is possible of four bits of information per one symbol. Even in the case of increase of the number of dimensions of the source orthogonal matrix in this manner, the combination of orthogonal signals having a large inter-signal point distance is associated with the combination of bit sequences having a large Hamming distance, and thus the effect of the present disclosure can be obtained. Further, the greatest effect can be obtained by associating the combination of information words having the maximum Hamming distance with the combination of orthogonal signals having the maximum inter-signal point distance.

Further, the aforementioned specific example of the association between the information words and the orthogonal signals illustrates an example, and the present disclosure is not limited to the aforementioned specific example.

Embodiment 2

A transmitter of Embodiment 2 of the present disclosure is described below. The configuration of the transmitter of Embodiment 2 is similar to the transmitter of Embodiment 1 illustrated in FIG. 1. The transmitter of Embodiment 2 uses a different symbol mapping method in the symbol generator 10. Operation of the transmitter of Embodiment 2 is described hereinafter centered on the symbol mapping in the symbol generator 10.

Figure 6:
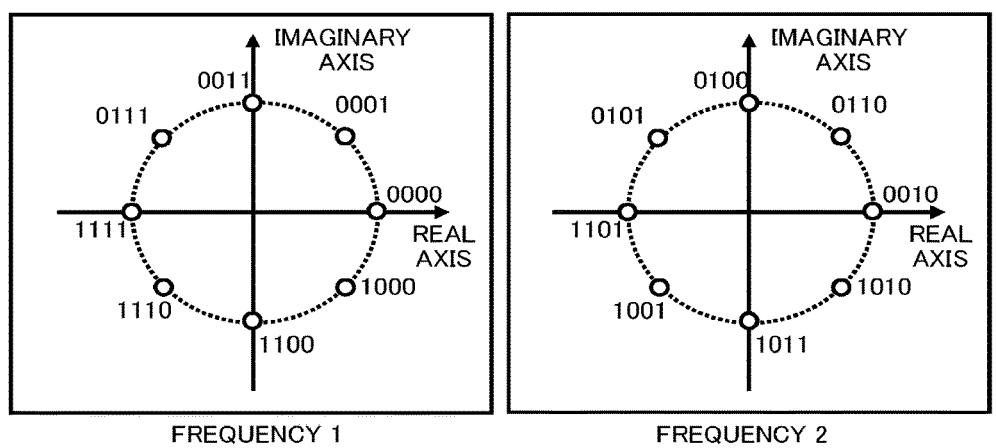
FIG. 6 is a schematic drawing illustrating one example of the symbol map of Embodiment 2 of the present disclosure.

FIG. 6 is a schematic drawing illustrating the association between the bit sequence and the orthogonal signal in the transmitter of the present embodiment. In the present embodiment, a configuration is used of orthogonal signals using bi-orthogonal modulation method based on orthogonal FSK, and eight initial phase states are adopted (nπ/4, where n is 0 to 7). Further, in the selection of frequencies, selection is taken to be possible of two frequencies (frequency 1 and frequency 2), 16 orthogonal signals can be defined by combining the frequencies and phase states, and four bits can be transmitted per one symbol. FIG. 6 illustrates the bit sequences associating with the orthogonal signals combining frequencies and phase states.

In the symbol mapping in the case of FIG. 6, the combination that has the maximum inter-signal point distance is the combination in which the phase states are mutually different by π in the same manner as in Embodiment 1, and the combination that has the minimum inter-signal point distance is the combination in which the initial phase states are mutually different by π/4 within the same frequency. According to the symbol mapping of the present embodiment, the bit sequences and orthogonal signals are taken to be associated beforehand such that the combination of bit sequences having a large (such as a maximum) Hamming distance is associated with the combination of orthogonal signals having a large (such as the maximum) inter-signal point distance, and also the combination of bit sequences having a small (such as a minimum) Hamming distance is associated with the combination of orthogonal signals having a small (such as the minimum) inter-signal point distance.

In the transmitter of the present embodiment, when performing transmission using bi-orthogonal modulation method, symbol mapping that associates the bit sequences with the sine waves and phase states composing the orthogonal signals is performed on the basis of the association between bit sequences and orthogonal signals so that the combination having a large Hamming distance between bit sequences is associated with the combination of orthogonal signals having the large inter-signal point distance, and the combination having a small Hamming distance between bit sequences is associated with the combination of orthogonal signals having the small inter-signal point distance. By such association, bit errors can be further reduced in the cases in which there are the combinations having the large, intermediate, and small inter-signal point distances, and communication can be performed with improved communication performance.

Further, according to the present embodiment, in view of the fact that the probability of occurrence of decision errors between orthogonal signals that have a small inter-signal point distance is high, the combination of orthogonal signals having the small inter-signal point distance is associated with the combination of bit sequences having the small Hamming distance. However, this configuration is not limited, and a combination of orthogonal signals can be found, on the basis of a different standard, for which probability of occurrence of decision errors is higher, and the orthogonal signals and bit sequences can be associated such that this combination is associated with the combination of bit sequences having the small Hamming distance.

For example, upon consideration of the case of using orthogonal signals by assuming four initial phases with respect to the orthogonal 4FSK illustrated in FIG. 5, due to the relationship between orthogonal signals, the inter-signal point distance between the orthogonal signals having the same frequency and having phases different by π/2 is equal to the inter-signal point distance between the orthogonal signals having the different frequencies and having phases that are the same or different by π/2. However, in the case in which there exists a synchronization error component such as a residual carrier phase synchronization component at the receiver, a phase rotation component in response to the synchronization error component can be considered to occur in the output of the correlation processor, and due to the effect of the phase rotation component, there is the possibility of easier occurrence of decision errors between orthogonal signals when frequencies are the same.

In such a case, the bit sequences and the orthogonal signals may be determined such that the combination having a large Hamming distance between bit sequences may be associated with the combination of orthogonal signals having the large signal point distance, and the combination having a small Hamming distance between bit sequences may be associated with the combination of orthogonal signals that have the same frequencies and have adjacent initial phases. That is to say, during configuration of the orthogonal signals, the combination of orthogonal signals having adjacent phase rotation amounts and being identical except for the phase rotation amounts may be adopted as the combination of orthogonal signals for which the probability of occurrence of decision errors is higher.

Further, in the present embodiment, a case is described in which the orthogonal signals are configured using bi-orthogonal modulation method based on orthogonal FSK. However, the configuration can similarly use bi-orthogonal modulation method that is based on FSK of any desired number of dimensions, such as orthogonal 4FSK and orthogonal 8FSK. In this case, the inter-signal point distance between orthogonal signals having different frequencies, due to the relationship between mutually orthogonal signals, is the same as the case of orthogonal FSK indicated in the present embodiment. Thus on the basis of the magnitude of the inter-signal point distance between orthogonal signals of the same frequency and the magnitude of the inter-signal point distance between orthogonal signals having different frequencies, the association between the bit sequences and the orthogonal signals can be determined in the same manner as the aforementioned case of orthogonal FSK.

Further, although in the present embodiment orthogonal signals are used that are configured on the basis of orthogonal FSK, configuration of the orthogonal signals is possible, in the same manner as Embodiment 1, on the basis of an orthogonal matrix such as the Hadamard matrix.

Further, although a case is described in the present embodiment in which amplitude of the modulation symbols is fixed, a configuration may be used in which the amplitude differs. In the case of the use of multiple amplitudes, in response to the number of amplitudes, increase is possible in the number of bits of information that can be transmitted per one symbol. Further, in the case of use of different amplitudes, although inter-signal point distances occur other than those cited in the present embodiment, the inter-signal point distances are uniquely determined from the relationships between orthogonal signals, and thus the association between the bit sequences and the orthogonal signals may be determined such that the combination of bit sequences having the small Hamming distance is associated with the combination of orthogonal signals in which the probability of occurrence of decision errors is higher, and the combination of bit sequences having the large Hamming distance is associated with the combination of orthogonal signals in which the probability of occurrence of decision errors is lower.

Further, although this description only mentions the transmitter, a receiver using symbol mapping that is similar to that of the transmitter of the present embodiment can naturally be used, for example, with the receiver configured similarly to that of FIG. 3 as indicated in Embodiment 1.

Embodiment 3

Figure 7:
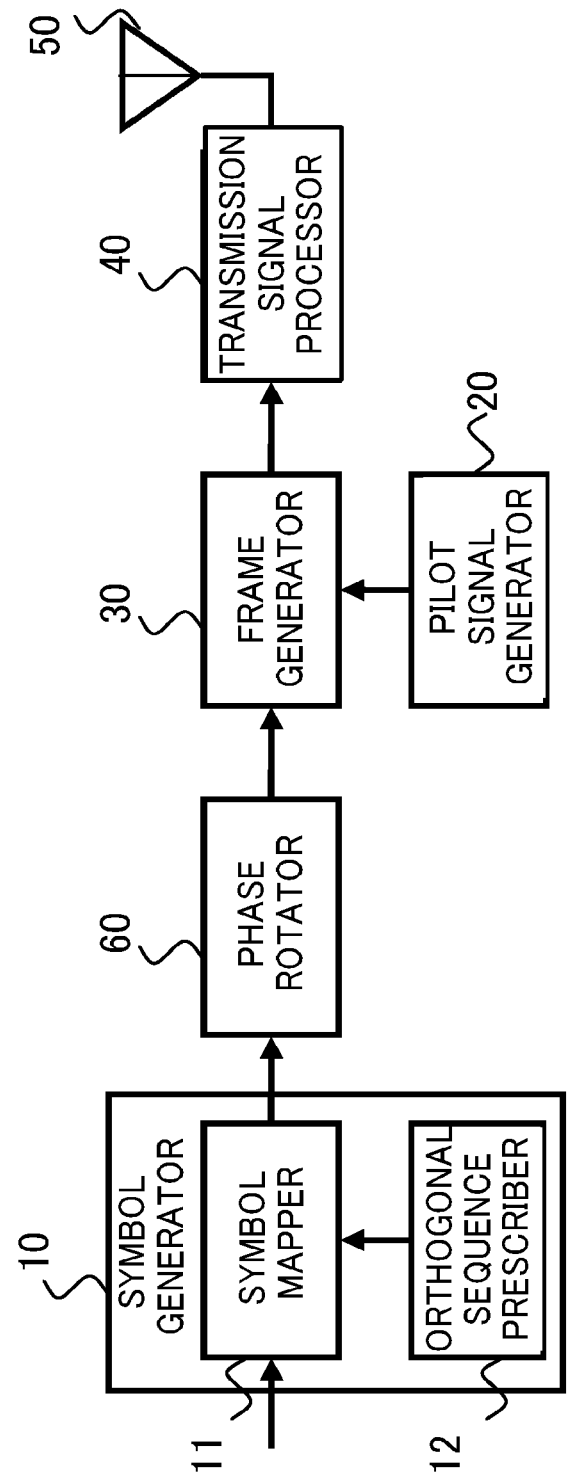
FIG. 7 is a block diagram illustrating one example of a function configuration of the transmitter of Embodiment 3 of the present disclosure.

FIG. 7 is a block diagram illustrating a function configuration of the transmitter of Embodiment 3 of the present disclosure. The transmitter of the present embodiment differs from the transmitter of Embodiment 1 illustrated in FIG. 1 in that a phase rotator 60 is provided that rotates phase of the bi-orthogonal modulation symbols generated by the symbol generator 10.

Operation of the transmitter of the present embodiment is described below centered on the points of difference relative to Embodiment 1. Upon input of the bi-orthogonal modulation symbols generated by the symbol generator 10 by processing in the same manner as in Embodiment 1, the phase rotator 60 performs a certain phase rotation of the input bi-orthogonal modulation symbols, and outputs the phase-rotated bi-orthogonal modulation symbols to the frame generator 30. Operation of the phase rotator is described in detail in reference to FIG. 8.

Figure 8:
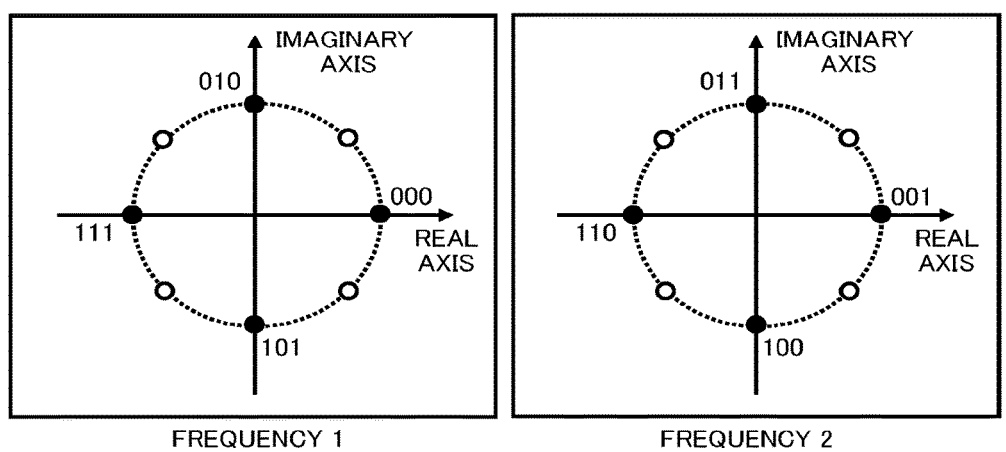
FIG. 8 is a block diagram illustrating one example of phase rotations of a signal point in Embodiment 3 of the present disclosure.

In FIG. 8, the orthogonal signals occurring in the symbol mapping based on the orthogonal FSK cited in FIG. 4 are indicated by black spots ("●" within the figure), and the phase states assumable by the bi-orthogonal modulation symbols after phase rotation by the phase rotator 60 are indicated by the white spots ("○" within the figure). The phase rotator 60 performs phase rotation of the input bi-orthogonal modulation symbols by a phase rotation amount determined in response to the number of defined phase states for the orthogonal signals and the transmission timing of the bi-orthogonal modulation symbols. Further, if the number of phase states defined for the orthogonal signals is taken here to be X, and if the transmission timing is expressed by the variable k (where k=0, 1, 2, . . . ) whose initial value is 0 and is incremented by one unit for each bi-orthogonal modulation symbol, then the phase rotation amount is calculated as $k\pi/X$. However, this is one example of a method of determination of the phase rotation amount, and other determination methods may be used in response to the number of defined phase states of the orthogonal signals and the transmission timing of the bi-orthogonal modulation symbols.

The example of FIG. 8 is described below in detail. Firstly, when k=0, the phase rotator 60 outputs the input bi-orthogonal modulation symbols as is. That is to say, the phase rotator 60 outputs one of the signals indicated by the black spots in FIG. 8 as determined from the transmission bit sequence. Next, when k=1, X=4, and thus the phase rotation amount becomes $k\pi/X=\pi/4$. For the input bi-orthogonal modulation symbol, the phase rotator 60 performs phase rotation corresponding to $\pi/4$, and outputs the phase-rotated bi-orthogonal modulation symbol. That is to say, a signal is received that corresponds to one of the black spots of FIG. 8 as determined from the transmission bit sequence, phase is rotated by $\pi/4$, and thus the output signal corresponds to one of the white spots of FIG. 8.

Figure 9:
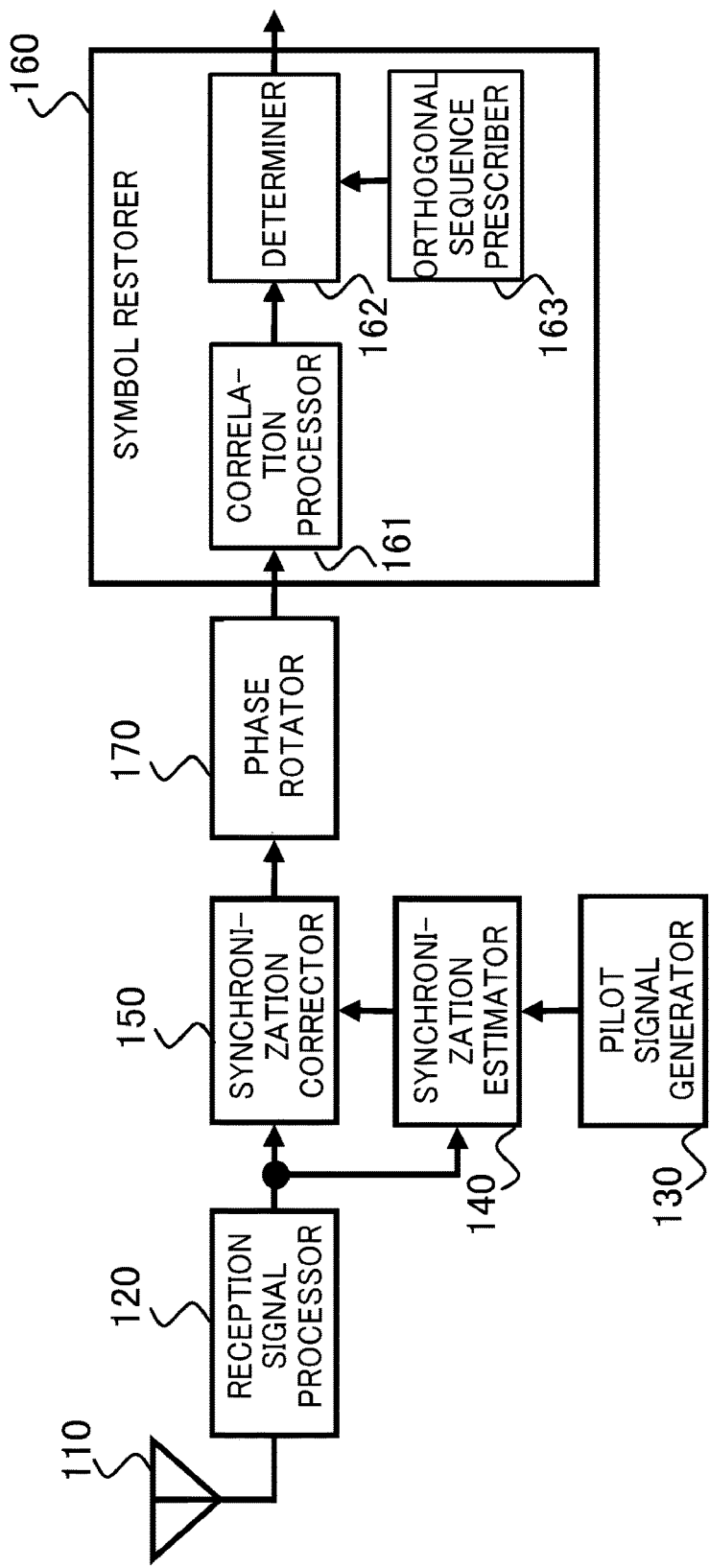
FIG. 9 is a block diagram illustrating one example of a function configuration of the transmitter of Embodiment 3 of the present disclosure.

Further, the receiver opposing the transmitter of Embodiment 3 may be configured by providing, in the stage prior to the correlation processor as illustrated in FIG. 9, a phase rotator 170 for performing phase rotation of the base band digital signal after synchronization-corrected output by the synchronization corrector 150, and a phase rotator 80 may be used to perform inverse phase rotation that cancels the phase rotation performed on the transmitted bi-orthogonal modulation symbols by the phase rotator 170 of the transmitter. Further, in FIG. 9, blocks assigned the same reference signs as those of the receiver of Embodiment 1 illustrated in FIG. 3 are blocks that are similar to those of the receiver of Embodiment 1.

By phase rotating the bi-orthogonal modulation symbols in this manner, the phase shift amount at the boundary of adjacent symbols can be suppressed. That is to say, PAPR characteristics can be enhanced due to suppressing envelope fluctuations of the transmission signal. Further, in bi-orthogonal modulation method that is configured on the basis of orthogonal FSK (of any desired number of dimensions), the signal waveform within a single bi-orthogonal modulation symbol is a continuous sine wave, and discontinuous phase deviations only occur at the symbol boundaries. Thus the enhancement effect of PAPR characteristics due to phase rotation of the bi-orthogonal modulation symbols is quite remarkable in the case of bi-orthogonal modulation method on the basis of orthogonal FSK.

As described above, the transmitter of the present embodiment is equipped with a phase rotator that performs phase rotation of the bi-orthogonal modulation symbols generated by the symbol generator by a phase rotation amount determined in response to the number of phase states assumed by the bi-orthogonal modulation symbols and the transmission timing of the bi-orthogonal modulation symbols. Thus the phase deviation amount at the boundary of adjacent bi-orthogonal modulation symbols can be suppressed, envelope fluctuations of the transmission signal can be suppressed, and communication can be performed with enhanced PAPR characteristics.

Further, although a case is described here in which the phase rotation amounts for each bi-orthogonal modulation symbol are determined in response to the number of defined phase states for the orthogonal signals and the transmission timing of the bi-orthogonal modulation symbols, a similar effect can be obtained when phase rotation is performed by a phase rotation amount that changes according to the transmission timing, and the determination of the phase rotation amounts of the bi-orthogonal modulation symbols may be made without necessarily being in response to the number of defined phase states for the orthogonal signal in the manner of the aforementioned example.

Further, the receiver of the present embodiment is equipped with a phase rotator at the stage prior to the correlation processor. Thus in the case of the performance of phase rotation by the phase rotation amounts determined in response to the number of phase states assumed by the bi-orthogonal modulation symbols and the transmission timing of the bi-orthogonal modulation symbols of the opposing transmitter, phase rotation can be performed that cancels the phase rotation performed by the opposing transmitter, and communication can be performed with enhanced PAPR characteristics.

Embodiment 4

Figure 10:
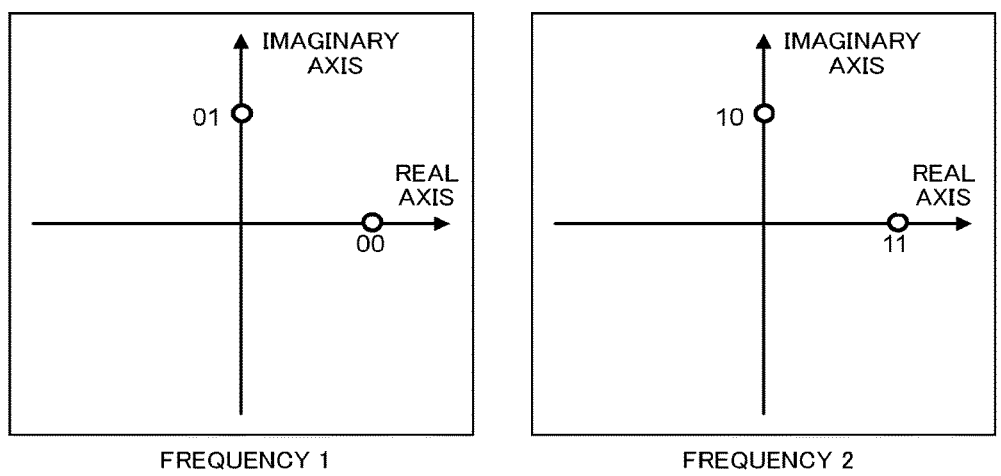
FIG. 10 is a schematic drawing illustrating one example of the symbol map of Embodiment 4 of the present disclosure.

Next, the transmitter according to Embodiment 4 of the present disclosure is described. The overall configuration of the transmitter according to the present embodiment is similar to that of FIG. 1, although the symbol map used by the symbol mapper 11 is different. The symbol map used by the symbol mapper 11 of the present embodiment is illustrated in FIG. 10. The characteristic points of the symbol mapper 11 of the present embodiment are: utilizing for bi-orthogonal modulation method the combination of two different phase states in orthogonal FSK composed using sine waves of two different frequencies, using the combination 0 and $\pi/2$ as two different phase states, and associating transmission bit sequences so as to minimize the Hamming distance between two different phase states at the same frequency.

In the case of use of the symbol map illustrated in FIG. 10, due to configuration so as to assume only 0 and $\pi/2$ as the phase states, the phase deviation amount at the boundaries of the symbols can be suppressed due to the small phase rotation amounts difference in comparison to the case, for example, of configuration using 0 and $\pi$ as the phase states as illustrated in FIG. 2. As a result, communication can be performed with enhanced PAPR characteristics. Further, due to the use of 0 and $\pi/2$ as the two different phases states that have an orthogonal relationship in the complex plane, while enhancing the PAPR characteristics in the aforementioned manner, any of the inter-signal point distance of the signal points illustrated in FIG. 2 can be maintained at the value of A times the square root of 2 (where A indicates the amplitude), which generally indicates the inter-signal point distance.

According to the orthogonal signals of the present embodiment, although the probability of occurrence of decision errors dependent on the magnitude of the inter-signal point distance is fixed, between signal points having different phase rotation amounts, there is the possibility of easy occurrence of errors due to effects such as residual carrier phase synchronization error and the like at the receiver. Due to the combination of orthogonal signals having two different phase states in this manner being associated with the combination of transmission bit sequences having the minimum Hamming distance, bit errors can be minimized during the occurrence of decision errors due to effects such as residual carrier phase synchronization error.

Further, according to the symbol map used by the transmitter of the present embodiment, the symbol map is configured using 0 and $\pi/2$ as the two different phase states. However, the present disclosure is not limited to this configuration, and any desired configuration can be adopted as long as the two different phase states have an orthogonal relationship in the complex plane. For example, 0 and $-\pi/2$ may be used, or alternatively, $\pi/2$ and $\pi$ may be used. Further, a configuration may be used that does not necessarily place the signal points on the real and imaginary axes. For example, a combination may be used such as $\pi/4$ and $3\pi/4$.

Further, the present embodiment illustrates a case in which bi-orthogonal modulation method is configured using orthogonal FSK that is configured using sine waves of two different frequencies. However, the number of frequencies used in orthogonal FSK is not limited to two, and any desired number may be used. For example, in the case using orthogonal FSK configured using sine waves of four different frequencies, 3 bits can be transmitted per one symbol. Also in this case, a similar configuration can be realized, for example, by the use of the symbol map illustrated in FIG. 11.

The transmitter of the present embodiment in the aforementioned manner is equipped with:

the orthogonal sequence prescriber that, on the basis of each of occurrence of decision errors between orthogonal signals of bi-orthogonal modulation method configured by phase rotation amounts corresponding to two phase states orthogonal in the complex plane in the orthogonal frequency shift keying (FSK) method using two frequencies and size differences between information words, associates the combination of information words having the small Hamming distance indicating the size of differences between information words with the combination of orthogonal signals that are the same except for having phase rotation amounts that are adjacent during the configuration of the orthogonal signals, and that determines association by associating one information word with one orthogonal signal and associating other information words with other orthogonal signals in the combination of the associated information words and the combination of orthogonal signals; and a symbol mapper that generates modulation symbols on the basis of the orthogonal signals associated with the to-be-transmitted information word by associating the information words and orthogonal signals determined by the orthogonal sequence prescriber.

Figure 11:
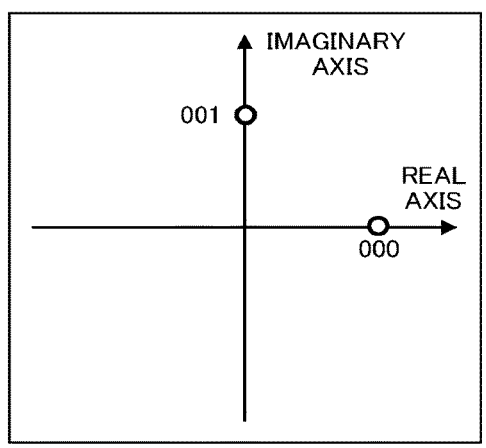
FIG. 11 is a schematic drawing illustrating a modified example of the symbol map of Embodiment 4 of the present disclosure.
Figure 11:
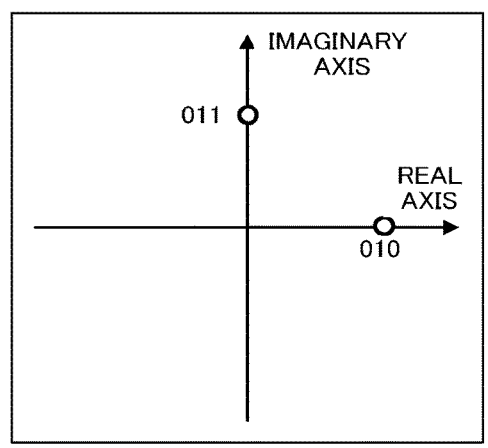
Figure 11:
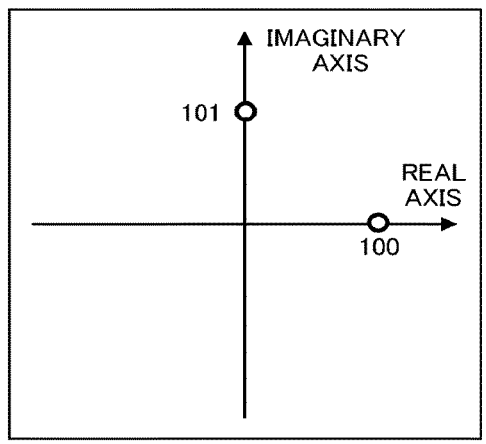
Figure 11:
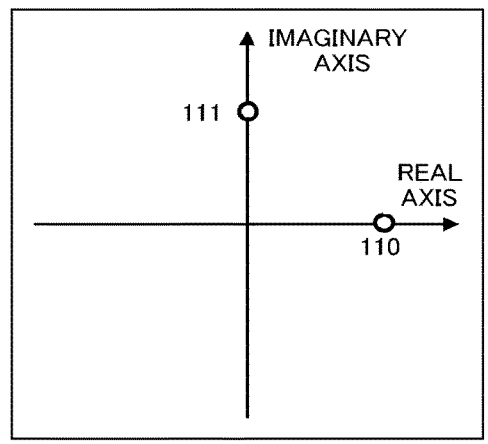

Further, the configuration of the receiver opposing the transmitter of the present embodiment may be similar to that of FIG. 3, and the symbols may be restored using a symbol map similar to that of the transmitter illustrated in the example of FIG. 10 or FIG. 11.

By this means, a transmission signal can be generated and transmitted that has symbol mapping that reduces the errors of transmitted information occurring due to decision errors at the receiver, and communication performance can be improved. Further, the phase difference is $\pi/2$, the phase deviation amount at the symbol boundary is small in comparison to the transmitter of Embodiment 1, and thus communication can be performed with enhanced PAPR characteristics.

The embodiments described above are for explaining the present disclosure, and do not limit the scope of the present disclosure. All modifications that can be considered are included in the scope of the present disclosure.

INDUSTRIAL APPLICABILITY

By use of the transmitter and the receiver of the present disclosure, the error rate of transmitted information can be reduced even when decision errors occur between orthogonal signals, and this reduction is useful for wireless communication devices.

REFERENCE SIGNS LIST

10 Symbol generator
11 Symbol mapper
12 Orthogonal sequence prescriber
20 Pilot signal generator
30 Frame generator
40 Transmission signal processor
50 Transmission antenna
60 Phase rotator
110 Reception antenna
120 Reception signal processor
130 Pilot signal generator
140 Synchronization estimator
150 Synchronization corrector
160 Symbol restorer
161 Correlation processor
162 Determiner
163 Orthogonal sequence prescriber
170 Phase rotator

The invention claimed is:

1. A transmitter comprising:
an orthogonal sequence prescriber to prescribe association between information words and orthogonal signals based on sizes of differences between information words of a plurality of mutually different information words and an inter-signal point distance between orthogonal signals of a plurality of mutually orthogonal signals; and
a symbol mapper to, upon inputting of any of the information words, generate modulation symbols based on the orthogonal signals associated with the input information words according to the associations prescribed by the orthogonal sequence prescriber, wherein
among the combinations of the information words, the orthogonal sequence prescriber associates combinations for which the size of the difference is maximum with, among combinations of the orthogonal signals, combinations for which the inter-signal point distance is maximum.

2. The transmitter according to claim 1, wherein
among the combinations of the information words, the orthogonal sequence prescriber associates combinations for which the size of the difference is minimum with, among the combinations of orthogonal signals, combinations for which the inter-signal point distance is minimum.

3. The transmitter according to claim 2, wherein
the orthogonal signals are bi-orthogonally modulated; and
among the combinations of the orthogonal signals, in each of the combinations for which the inter-signal point distance is minimum, the orthogonal signals have adjacent phase rotation amounts and are identical except for the phase rotation amounts.

4. The transmitter according to claim 1, wherein
the orthogonal signals are bi-orthogonally modulated; and
the transmitter further comprises a phase rotator that rotates phase of the modulation symbols generated by the symbol mapper by phase rotation amounts that differ from one another according to a transmission timing of the modulation symbols.

5. The transmitter according to claim 4, wherein
the phase rotation amounts of phase rotation of the modulation symbols are determined according to the transmission timing and a number of phase states defined for the orthogonal signals.

6. The transmitter according to claim 1, wherein
the orthogonal signals are bi-orthogonally modulated based on orthogonal frequency shift keying (FSK).

7. The transmitter according to claim 1, wherein
the orthogonal signals are bi-orthogonally modulated using in two phases that are orthogonal in a complex plane based on orthogonal frequency shift keying (FSK) using at least two mutually different frequencies; and
the orthogonal sequence prescriber associates the information words and the orthogonal signals such that:
among the combinations of the orthogonal signals, in each of the combinations for which the inter-signal point distance is minimum, the orthogonal signals have adjacent phase rotation amounts and are identical except for the phase rotation amounts; and
among the combinations of the information words, the combinations for which the size of the difference is minimum are associated with, among the combinations of orthogonal signals, the combinations for which the inter-signal point distance is minimum.

8. A receiver comprising:
a correlation processor to find a correlation between a plurality of orthogonal signals that are mutually orthogonal and an input signal obtained from a signal received from an opposing transmitter; and
a determiner to:

determine, based on the correlation found by the correlation processor, which of the orthogonal signals has been transmitted by the opposing transmitter, and restore an information word corresponding to a determined orthogonal signal based on an association between the information words and the orthogonal signals determined based on a size of differences between a plurality of mutually different information words and an inter-signal point distance between the orthogonal signals; wherein the association between the information words and the orthogonal signals is determined by at least one of the following:

among the combinations of the information words, associating combinations for which the size of the difference is maximum with, among combinations of the orthogonal signals, combinations for which the inter-signal point distance is maximum; and among the combinations of the information words, associating combinations for which the size of the difference is minimum with, among the combinations of orthogonal signals, combinations for which the inter-signal point distance is minimum.

9. The receiver according to claim 8, wherein the orthogonal signals are bi-orthogonally modulated; and among the combinations of the orthogonal signals, in each of the combinations for which the inter-signal point distance is minimum, the orthogonal signals have adjacent phase rotation amounts and are identical except for the phase rotation amounts.

10. The receiver according to claim 8, wherein the orthogonal signals are bi-orthogonally modulated;

the signal received from the opposing transmitter is a signal transmitted by the transmitter after rotating phase of modulation symbols by phase rotation amounts that differ from one another according to a transmission timing of the modulation symbols; and the receiver further comprises a phase rotator that rotates phase of the input signal obtained from the signal received from the opposing transmitter to cancel the phase rotated in the transmitter, and that inputs the phase-rotation-canceled signal to the correlation processor.

11. The receiver according to claim 8, wherein the orthogonal signals are bi-orthogonally modulated based on orthogonal frequency shift keying (FSK).

12. A receiver, comprising:

a correlation processor to find a correlation between a plurality of orthogonal signals that are mutually orthogonal and an input signal obtained from a signal received from an opposing transmitter; and a determiner to:

determine, based on the correlation found by the correlation processor, which of the orthogonal signals has been transmitted by the opposing transmitter, and restore an information word corresponding to a determined orthogonal signal based on an association between the information words and the orthogonal signals determined based on a size of differences between a plurality of mutually different information words and a probability of occurrence of determination errors between the orthogonal signals;

wherein the orthogonal signals are bi-orthogonally modulated;

the signal received from the opposing transmitter is a signal transmitted by the transmitter after rotating phase of modulation symbols by phase rotation amounts that differ from one another according to a transmission timing of the modulation symbols; and the receiver further comprises a phase rotator that rotates phase of the input signal obtained from the signal received from the opposing transmitter to cancel the phase rotated in the transmitter, and that inputs the phase-rotation-canceled signal to the correlation processor.

* * * * *